Oct. 27, 1970 C. D. DOLARMORE 3,536,852
TELEPHONE INTERRUPTION SWITCHING CIRCUITRY
Filed Jan. 23, 1969
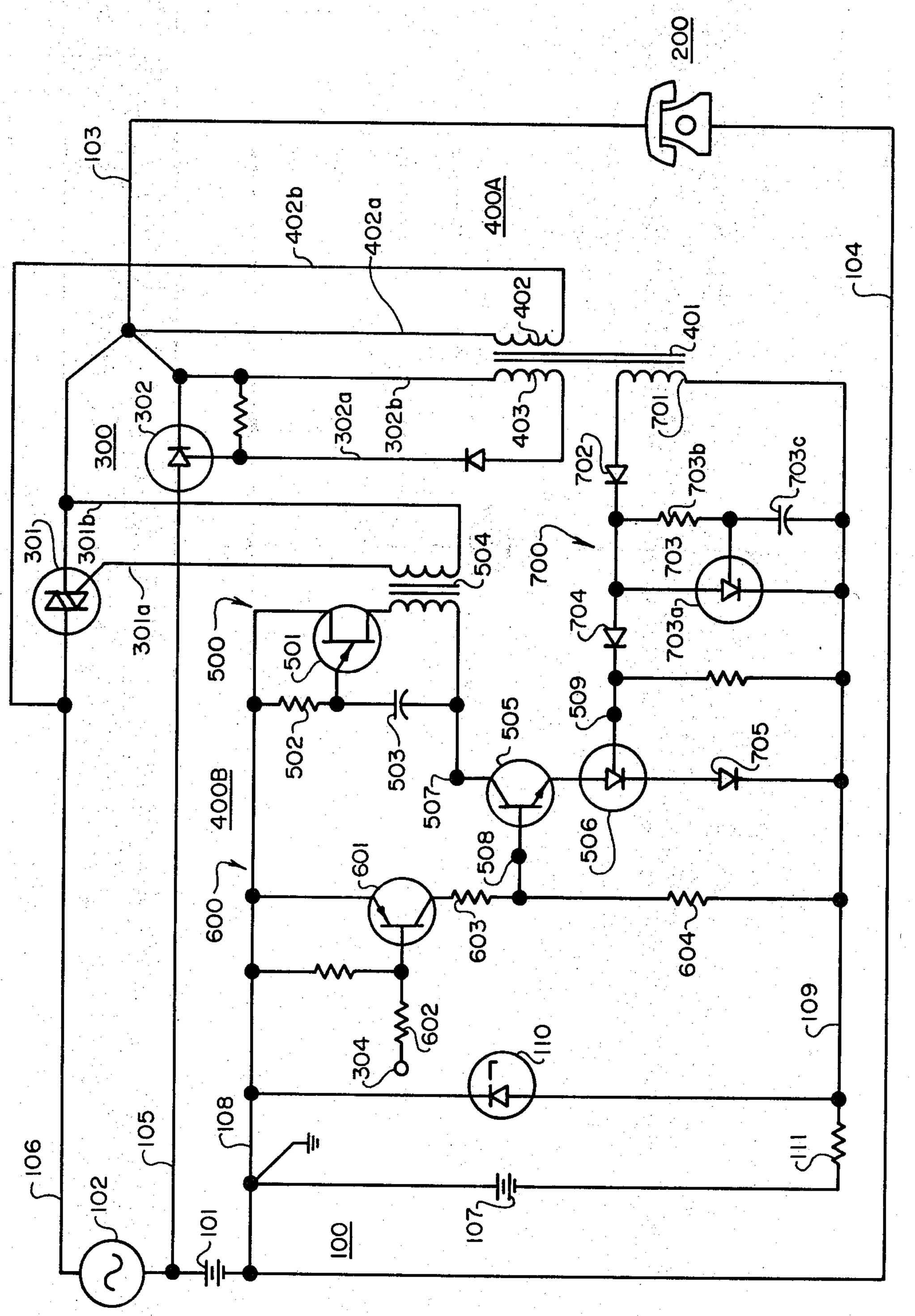
INVENTOR.
CHARLES D. DOLAMORE
BY John Howard Smith United States Patent Office 3,536,852

Patented Oct. 27, 1970

3,536,852

TELEPHONE INTERRUPTION SWITCHING CIRCUITRY

Charles D. Dolarmore, Lorain, Ohio, assignor to Lorain Products Corporation, a corporation of Ohio Filed Jan. 23, 1969, Ser. No. 793,387
Int. Cl. H04m 1/26
U.S. Cl. 179—84 10 Claims

ABSTRACT OF THE DISCLOSURE

A switching circuit for initiating and terminating the alternate ringing and quiet periods of an interrupted ringing pattern in telephone systems which utilize interrupted ringing. The quiet period is initiated by the firing of a thyristor, while the ringing period is initiated by the firing of a triac in alternate first and second directions. The firing circuit for the thyristor is arranged to withhold firing pulses from the thyristor until the prior turn off of the triac, and the firing circuit of the triac is arranged to withhold firing pulses from the triac until a go ahead signal from an interrupter coincides with the low voltage portion of the ringing voltage cycle.

BACKGROUND OF THE INVENTION

The present invention relates to telephony and is directed more particularly to improved telephone interruption switching circuitry referred to as ringing gate circuitry.

In telephone systems which utilize interrupted ringing, that is, systems which inform a called subscriber of an incoming call by producing an audible ringing pattern having alternate ringing and quiet periods, it has been the practice to provide a switching circuit known as a ringing gate to begin and terminate the successive ringing and quiet periods. Typically, ringing gates are two state devices which, in a first or quiet state, connect a D-C source to a subscriber line and which, in a second or ringing state, insert an A-C source between the D-C source and the subscriber line. Heretofore, ringing gates were operated by relays and were, therefore, subject to the disadvantages of contact deterioration and slowness of operation.

More recently, solid state ringing gates utilizing thyristors or triacs have been developed which are not subject to the difficulties of such mechanical switching arrangements. An important consideration in the design of such ringing gates is the proper coordination of the firing of the two or more thyristors or triacs of the power control circuit to avoid any condition under which simultaneous conduction in the different devices might short circuit the A-C or D-C sources, there being shown herein an improved interlock arrangement for accomplishing the above purpose.

A second consideration in the design of solid state ringing gates is the need to coordinate the firing of the different semiconductor devices which the ringing voltage. Because such ringing gates have, prior to the present invention, been caused to switch from the quiet to the ringing states or vice versa in accordance with a control signal from a ringing pattern establishing device or interrupter, the output of which was not synchronized with the ringing voltage, such ringing gates at times switched from the quiet to the ringing state when the ringing voltage was low, for instance, early in the ringing cycle, and at other times switched from the quiet to the ringing state when the ringing voltage was high, as for instance, at the peak of the ringing voltage cycle. It has been found that the latter switching condition produces a current signal in the subscriber line which, due to the high voltages present, introduces a sound similar to a "click" in the audible ringback tone of the calling party. Clicking noises of this type are unacceptable, especially in situations where calls are made to or from subscriber loops having two or more parties, because of the similarity of the sound to that produced when an eavesdropper accesses the line. Thus, the clicking noises produced by solid state ringing gates, prior to the present invention, have resulted in complaints from subscribers concerned from the privacy of their conversations.

SUMMARY

Accordingly, it is an object of the invention to provide a solid state ringing gate circuit, including means to avoid simultaneous conduction of power control elements and in which circuitry is provided to assure against the generation of "clicks" as it switches from its quiet to its ringing states.

It is an other object of my invention to provide a solid state ringing gate in which the switching from the quiet to the ringing states is coordinated with the ringing voltage.

It is still another object of my invention to provide a control circuit for a solid state ringing gate of the above character in which the switching from the quiet to the ringing states requires the concurrence of a control signal from suitable interrupter means and a control signal derived from the ringing voltage.

Another object of my invention is to provide a ringing voltage controlled switch circuit which produces a control signal only during that portion of the ringing voltage cycle when the ringing voltage is below a predetermined value.

It is another object of my invention to provide a ringing voltage controlled switch circuit which includes a bypass switch means for disabling the output of the ringing voltage controlled switch circuit after the ringing voltage attains a value sufficient to cause conduction in the bypass switch means.

Generally speaking, the invention comprises a solid state ringing gate control circuit which restricts the time at which the ringing gate may switch from its quiet to its ringing state to a period during which the ringing voltage is of a polarity which will commutate off the already conducting semiconductor, and during which the ringing voltage is less than a predetermined value. This time period begins when the ringing voltage assumes the polarity required for proper commutation and terminates when the ringing voltage rises to a value which causes conduction in a bypass switch means arranged in disabling relationship to the ringing voltage controlled switch circuit.

DESCRIPTION OF THE DRAWINGS

The single drawing is a schematic diagram of a circuit embodying one form of the invention.

DESCRIPTION OF THE INVENTION

Referring to the drawing there is shown a power section 100 which furnishes the A-C ringing and the D-C or trip voltages required by a subscriber station 200 during the ringing interruption pattern, the duration of the ringing and quiet periods being controlled in accordance with the two states of a power control circuit shown at 300. The power control circuit 300 is caused to switch from its ringing to its quiet state by a "ring-to-quiet" switch means 400*a* and to switch from its quiet state to its ringing state by a "quiet-to-ring" switch means 400*b*.

The power circuit 100 includes a source of D-C trip current 101 and a ringing generator 102 for connection to a subscribed station 200 through subscriber line conductors 103 and 104 which comprises the subscriber loop. When conductor 103 is connected to trip source 101 through a conductor 105, the D-C voltage of trip source 101 appears across subscriber line conductors 103 and 104 and the ringing gate circuit is said to be in its quiet state because no ringing sound is produced at subscriber station 200; when, however, the latter connection is broken and conductor 103 is connected to ringing generator 102 through a conductor 106, trip source 101 and ringing generator 102 are connected in series across the subscriber loop, that is across line conductors 103 and 104, and the ringing gate circuit is said to be in its ringing state because a ringing sound is produced at the subscriber station.

Power section 100 also includes central office battery 107 which, in the present embodiment, energizes the control circuitry of the invention through a positive supply conductor 108 and a negative return conductor 109. In the present embodiment, the control circuit operating voltage between conductors 108 and 109 is regulated by a Zener or regulating diode 110 and the control circuit current is limited by a resistor 111.

To the end that the power control circuit 300 may allow the flow of a D-C current through conductors 105, 103 and 104 when the ringing gate is to operate in its quiet state, and may allow the flow of an A-C current through conductors 106, 103 and 104 when the ringing gate is to operate in its ringing state, the off-on conducting means 301 and 302, herein comprising respectively a triac and a thyristor, are provided. The ability of a gate current to trigger the conduction of a triac 301 in either direction, depending upon the polarity of the voltage appearing thereacross, allows it to control the passage of both half cycles of the ringing current to the subscriber line. Because, however, D-C trip current from source 101 flows in only a single direction in the subscriber line during the quiet period, the off-on conducting means 302 need not be of the bidirectional or triac type and, hence, is shown as a thyristor.

Triac 301 is turned on by "quiet-to-ring" switch means 400*b* through control conductors 301*a* and 301*b* to establish the ringing state of the ringing gate, while thyristor 302 is turned on by "ring-to-quiet" switch means 400*a* through control conductors 302*a* and 302*b* to establish the quiet state of the ringing gate. In accordance with the invention, quiet-to-ring switch means 400*b* is under the control of a suitable interrupter output signal impressed upon an interrupter terminal 304 and also under the control of the ringing voltage generated at 102, while the switch means 400*a* is controlled by the voltage which appears across triac 301, as will be described more fully presently.

To the end that thyristor 302 may be rendered conducting, to initiate the changeover from the ringing to the quiet states only after the turn-off of triac 301, the ring-to-quiet switch means or trip control means 400*a* is provided. This circuit comprises an interlock arrangement and includes a feedback transformer 401 having a primary winding 402 connected across triac 301 by conductors 402*a* and 402*b* and a secondary winding 403 connected across the gate-cathode control circuit of thyristor 302 by conductors 302*a* and 302*b*. It will be seen that when triac 301 is non-conducting the voltage of ringing generator 102 appears across the primary winding of transformer 401 and that when triac 301 is conducting, no such voltage appears thereacross. Consequently, the voltage necessary for firing thyristor 302 appears across secondary winding 403 only when triac 301 has already attained its blocking state. Because the turn-on of thyristor 302 requires the prior turn-off of triac 301, it is apparent that ringing generator 102 is protected from a short circuit which might occur if the latter devices were allowed to conduct at the same time.

In order that the switching from the quiet to the ringing states of the ringing gate may occur only during that period of time when the polarity of the ringing voltage is such that the firing of triac 301 will turn off thyristor 302, and in order that the switching from the quiet to the ringing states may occur only while the ringing voltage is low enough to prevent the introduction of an audible click in the subscriber line, the quiet-to-ring switch means or ringing control means 400*b* is provided. The latter circuit includes a gated oscillator means 500, an interrupter controlled switch means 600, and a ringing voltage controlled switch means 700.

Because the reversals in the direction of flow of the A-C ringing current during the ringing cycle return the triac 301 to its blocking state twice during each cycle, it is necessary to retrigger the triac first in one direction and then in the other to maintain the flow of A-C current therethrough. In the circuit shown, this retriggering is accomplished by supplying a succession or train of firing pulses having a frequency which is high in relation to the ringing frequency when ringing is to occur. In this manner triac 301 cannot exist in the blocking state (which is initiated by each ringing current reversal) for a time which exceeds the time separating the firing pulses. These firing pulses are supplied from a gated oscillator means 500 which, in the present embodiment, includes a pulse generator means having a unijunction transistor 501, a timing circuit comprising a resistor 502 and a capacitor 503, and an output transformer 504.

As is well known, a unijunction oscillator circuit will produce a train of output pulses only when a voltage appears thereacross. To achieve switching from the quiet to the ringing state only when an interrupter control signal at 304 is present simultaneously with a control signal derived from the ringing voltage, the quiet-to-ring switch means 400*b* is arranged to produce a voltage across the gated oscillator means only if controllable conducting or gate means 505 and 506, herein shown as a transistor and a thyristor respectively, are both in the conducting state to connect an oscillator control junction 507 to negative conductor 109. Thus, before firing pulses from the oscillator are supplied to triac 301 to initiate the ringing period, a control signal from interrupter controlled switch circuit 600 appearing at a junction 508 must be such as to turn on transistor 505, and a control signal from ringing voltage controlled switch circuit 700 appearing at junction 509 must be such as to turn on thyristor 506.

To the end that a drive signal for gate element 505 may appear at a control junction 508 when the interrupter produces a ring control signal, the interrupter controlled switch circuit 600 is provided. The latter circuit includes a transistor 601, having a base current limiting resistor 602 and collector load resistors 603 and 604. It will be seen that when the interrupter causes control terminal 304 to become negative from conductor 108, a base-emitter control current is established in transistor 601 which results in the flow of emitter-collector current through resistors 603 and 604. Because the voltage produced across resistor 604 by the latter current appears between control junction 508 and conductor 109, the transistor 505 tries to turn on but fails unless gate element 506 is also trying to turn on at the same time. Thus, the interrupter controlled switch circuit 600 supplies one portion of the dual control over oscillator 500 when the interrupter tries to initiate ringing.

It is desirable that thyristor 506 conduct only when the polarity of the ringing voltage permits the firing of triac 301 to turn off the thyristor 302 and only when the ringing voltage is sufficiently low to prevent the aforementioned clicking sound at the subscriber station 200. To this end, there is provided a ringing voltage controlled switch circuit 700 which includes a suitable source of ringing voltage 701, a rectifying diode 702, a bypass switch means 703 having, in the present embodiment, a triggerable conducting means 703, herein shown as a thyristor, and a timing circuit comprising a resistor 703*b* and a capacitor 703*c*, a blocking diode 704 and a diode 705 for increasing the firing threshold of thyristor 506.

It is desirable that the source of ringing voltage 701 produces a voltage proportional to the ringing voltage at least during those times when quiet-to-ring switch means **400*b* is required to operate. Accordingly, source 701 may be a secondary winding on transformer 401 which, as described previously, is excited by the ringing voltage appearing across triac 301, or an arrangement distinct from transformer 401 which is coupled in any convenient manner to the ringing generator 102**.

The operation of the ringing voltage controlled switch circuit 700 will now be described. When thyristor 302 is conducting and ringing generator 102 causes a voltage to appear across triac 301, positive on the right, it is undesirable that firing pulses be applied to triac 301, since the firing of the latter at this time would result in a near short circuit across ringing generator 102. While this ringing voltage polarity persists, source 701 applies a reverse voltage to the gate-cathode control circuit of thyristor 506 insuring the non-conduction thereof and the resulting absence of pulses from oscillator 500. When, however, the ringing voltage polarity reverses, causing the voltage across triac 301 to appear positive on the left, the application of firing pulses to triac 301 is desirable since the conduction of the latter at this time would result in the commutation of thyristor 302. Under these conditions, the voltage across source 701 is also reversed to produce the flow of gate-cathode control current through thyristor 506 which, given the presence of a drive signal for gate element 505, will allow the generation of firing pulses for triac 301. Thus, triac 301 may be fired only during those half cycles of the ringing voltage when proper commutation of thyristor 302 occurs.

To the end that clicking sounds are eliminated during the switching from the quiet to the ringing states, the bypass switch means 703 permits the triggering of triac 301 only during the initial, low voltage portion of the ringing cycle and only then if the interrupter signal at 304 is present. When the ringing voltage is of a polarity which produces a voltage across triac 301 positive on the left as shown in the drawing, the capacitor **703*c* will begin to charge through resistor 703*b* due to the A-C signal on windings 402 and 701. After a predetermined time, the charging of capacitor 703*c* will raise the voltage applied between the gate and cathode of thyristor 703*a* to a value which will cause the triggering thereof, which, in turn, shunts current away from the gate of thyristor 506. Thus, if gate element 506 has not fired by the time the charging of capacitor 703*c* causes the firing of thyristor 703*a*, the thyristor 506 must remain in its blocking state until the ringing voltage cycle runs its course and once again attains the required polarity; but if thyristor 506 has been allowed to turn on during this interval, as a result of the conduction of transistor 505, thyristor 506 will remain conducting until the current therethrough is reduced below its holding value as the interrupter initiates the turn off of transistor 505** at the end of the ringing period.

In summary, it will be seen that the switching from the quiet to the ringing states can occur only when the interrupter produces a control signal and only when the ringing voltage is of the correct polarity and below a predetermined value. Once these conditions occur simultaneously however, the conduction of gate elements 505 and 506 becomes independent of the ringing voltage polarity and both devices remain conducting to energize oscillator 500 (and thereby supply the desired train of firing pulses to triac 301) during the ringing period.

When the interrupter control signal is removed at the end of the ringing period, the current through both transistor 505 and thyristor 506 is cut off and the train of firing pulses from oscillator 500 terminates. As a result, triac 301 attains its blocking state during the next reversal of the ringing current and the ringing voltage appears across winding 402. Under these conditions, the conduction of thyristor 302 is resumed and continues until the interrupter and the ringing voltage once again produce concurrent control signals.

In view of the foregoing, it is apparent that a ringing gate constructed in accordance with the invention will coordinate the beginning of the ringing pattern, as established by an interrupter, with the ringing voltage so as to furnish safe and predictable switching between gates without subjecting either the ringing gate or the subscriber circuit to wide variations in commutating currents during the ringing pattern or surge currents which may result in audible clicks.

It will be understood that the foregoing embodiment is shown for explanatory purposes only and may be changed and modified without departing from the spirit and scope of the appended claims.

What is claimed is:

1. In a telephone interruption switching circuit of the type utilizing a ringing generator and a source of D-C trip current to operate a subscriber circuit, in combination, a power control circuit including a plurality of off-on conducting means, means for connecting one of said off-on conducting means between the ringing generator and the subscriber loop, means for connecting another off-one conducting means between the source of D-C trip current and the subscriber loop, ring-to-quiet switch means, means for electrically connecting said ring-to-quiet switch means in energizing relationship to said off-on conducting means connected to said source of D-C trip current, quiet-to-ring switch means, means for electrically connecting said quiet-to-ring switch means in energizing relationship to said off-on conducting means connected to said ringing generator, said quiet-to-ring switch means including gated oscillator means, means for electrically connecting the output of said gated oscillator means in energizing relationship to the off-on conducting means connected to said ringing generator, said oscillator means including at least two control inputs, means for connecting said oscillator means to a source of D-C operating voltage, interrupter controlled switch means, means for connecting said last named switch means to an interrupter, means for connecting said interrupter controlled switch means in control relationship to one control input of said gated oscillator means, ringing voltage controlled switch means including a source of ringing voltage and bypass switch means, means for connecting said bypass switch means across said source of ringing voltage and in control relationship to another control input of said gated oscillator means, whereby said last named source of ringing voltage is bypassed with respect to said another control input.

2. A telephone interruption switching circuit as set forth in claim 1 in which said gated oscillator means includes pulse generator means, gate means, means for connecting said gate means in energizing relationship to said pulse generator means and means for connecting said gate means in control signal responsive relationship to said control inputs of said gated oscillator.

3. A telephone interruption switching circuit as set forth in claim 1 in which said gated oscillator means includes pulse generator means, first and second controllable conducting means, means for connecting said first and second controllable conducting means in energizing relationship to said pulse generator means and means for connecting said first and second controllable conducting means in control signal responsive relationship to respective control inputs of said gated oscillator means.

4. A telephone interruption switching circuit as set forth in claim 1 in which said bypass switch means includes a triggerable conducting means having a power circuit and a control circuit, a timing circuit, means for connecting the power circuit of said triggerable conducting means across said source of ringing voltage, means for connecting said timing circuit across said source of ringing voltage and means for connecting the control circuit of said triggerable conducting means to said timing circuit.

5. In a telephone interruption switching circuit of the type utilizing a ringing generator and a source of D-C trip current to operate a subscriber circuit, in combination, a power control circuit including a plurality of off-on conducting means, means for connecting one of said off-on conducting means between the ringing generator and the subscriber loop, means for connecting another off-on conducting means between the source of D-C trip current and the subscriber loop, ring-to-quiet switch means including a transformer having a primary winding and a secondary winding, means for connecting said primary winding in ringing voltage responsive relationship to said off-on conducting means connected to said ringing generator, means for connecting said secondary winding in energizing relationship to said off-on conducting means connected to said source of D-C trip current, quiet-to-ring switch means, means for electrically connecting said quiet-to-ring switch means in energizing relationship to said off-on conducting means connected to said ringing generator, said quiet-to-ring switch means including gated oscillator means, means for electrically connecting the output of said gated oscillator means in energizing relationship to the off-on conducting means connected to said ringing generator, said oscillator means including at least two control inputs and means for connecting said oscillator means to a source of D-C operating voltage, interrupter controlled switch means, means for connecting said last named switch means to an interrupter, means for connecting said interrupter controlled switch means in control relationship to one control input of said gated oscillator means, ringing voltage controlled switch means including a source of ringing voltage and bypass switch means, means for connecting said bypass switch means across said source of ringing voltage and in control relationship to another control input of said gated pulse generator means, whereby said last named source of ringing voltage is bypassed with respect to said another control input.

6. A telephone interruption switching circuit as set forth in claim 5 in which said bypass switch means includes a triggerable conducting means having a power circuit and a control circuit, a timing circuit, means for connecting the power circuit of said triggerable conducting means and said timing circuit across said source of ringing voltage and means for connecting the control circuit of said triggerable conducting means to said timing circuit.

7. A telephone interruption switching circuit as set forth in claim 5 in which said gated oscillator means includes a pulse generator means, gate means, means for connecting said gate means in energizing relationship to said pulse generator means and means for connecting said gate means in control signal responsive relationship to said control inputs of said gated oscillator.

8. A telephone interruption switching circuit as set forth in claim 5 in which said gated oscillator means includes a pulse generator means, first and second controllable conducting means, means for connecting said first and second controllable conducting means in energizing relationship to said pulse generator means and means for connecting said first and second controllable conducting means in control signal responsive relationship to respective control inputs of said gated oscillator means.

9. A telephone interruption switching circuit as set forth in claim 5 in which said source of ringing voltage comprises a second secondary winding on said transformer.

10. A telephone interruption switching circuit as set forth in claim 9 in which said bypass switch means comprises a triggerable conducting means having a power circuit and a control circuit, a timing circuit, means for connecting the power circuit of said triggerable conducting means and said timing circuit across said second secondary winding and means for connecting the control circuit of said triggerable conducting means to said timing circuit.

References Cited

UNITED STATES PATENTS

| | | | |
|---|---|---|---|
| 2,557,953 | 6/1951 | Duron | 179—84 |
| 3,341,665 | 9/1967 | Merkel et al. | 179—84 |

KATHLEEN H. CLAFFY, Primary Examiner

W. A. HELVESTINE, Assistant Examiner

U.S. Cl. X.R.

179—18

UNITED STATES PATENT OFFICE
CERTIFICATE OF CORRECTION

Patent No. 3,536,852 Dated October 27, 1970

Inventor(s) Charles Dolamore

It is certified that error appears in the above-identified patent and that said Letters Patent are hereby corrected as shown below:

In the Drawing Title change "Dolarmore" to --Dolamore--.

Column 1, line 4, change "Dolarmore" to --Dolamore--.

Column 1, line 58, change "which" to --with--.

Claim 1, line 7, change "off-one" to --off-on--.

Signed and sealed this 3rd day of August 1971.

(SEAL)
Attest:

EDWARD M.FLETCHER,JR.
Attesting Officer

WILLIAM E. SCHUYLER, JR.
Commissioner of Patents